United States Patent [19]

De Souza

[11] Patent Number: 5,539,986
[45] Date of Patent: Jul. 30, 1996

[54] DEVICE AND METHOD FOR REMOTE SENSING OF ROCK MOVEMENTS IN MINES

[75] Inventor: Euler M. De Souza, Kingston, Canada

[73] Assignee: Queen's University at Kingston, Kingston, Canada

[21] Appl. No.: 505,595

[22] Filed: Jul. 21, 1995

Related U.S. Application Data

[63] Continuation of Ser. No. 181,131, Jan. 13, 1994, abandoned.
[51] Int. Cl.$^6$ .............................. G01B 5/02; G01B 7/02
[52] U.S. Cl. .............................. 33/1 H; 33/809; 33/544.3
[58] Field of Search .......................... 33/1 H, 784, 787, 33/788, 789, 790, 793, 809, 544.3, 542

[56] References Cited

U.S. PATENT DOCUMENTS

| | | | |
|---|---|---|---|
| 1,427,773 | 9/1922 | Barrett | 33/790 |
| 1,708,333 | 4/1929 | Smith | 33/788 |
| 3,082,621 | 3/1963 | Soderholm | 33/788 |
| 3,277,579 | 10/1966 | Murphy | 33/809 |
| 4,514,905 | 5/1985 | Lutzens | 33/787 |
| 4,695,028 | 9/1987 | Hunter | 248/354.1 |
| 5,178,034 | 1/1993 | Reasoner | 74/502.6 |
| 5,215,411 | 6/1993 | Seegmiller | 405/290 |
| 5,238,213 | 8/1993 | Pool | 248/352 |

FOREIGN PATENT DOCUMENTS

| | | | |
|---|---|---|---|
| 0178066 | 5/1906 | Germany | 33/809 |
| 1087099 | 8/1960 | Germany | 33/809 |
| 0049802 | 3/1982 | Japan | 33/809 |
| 4286910 | 10/1992 | Japan | 33/787 |
| 0723128 | 3/1980 | U.S.S.R. | 33/787 |

Primary Examiner—Thomas B. Will

[57] ABSTRACT

A device and method for remotely measuring movement between opposed walls in dangerous situations such as unstable mining excavations is described. A spring loaded telescopic pole which can be handled in its contracted form by a remote arm or gantry is placed in position and a holding pin securing the two halves of the pole is extracted so that the pole extends into engagement with the opposed walls of the excavation or other situation. A linear or rotary potentiometer is provided between the two halves of the pole to measure any extensive or compressive movement of the spring loaded poles and produce an output signal representative thereof. The output signal can be read at a safe distance using any convenient readout system.

9 Claims, 3 Drawing Sheets

DEVICE AND METHOD FOR REMOTE SENSING OF ROCK MOVEMENTS IN MINES

This application is a continuation of application Ser. No. 08/181,131 filed Jan. 13, 1994 now abandoned.

FIELD OF INVENTION

This invention relates to a device and method for measuring movement between opposing walls or faces and more particularly to an instrument which can be remotely positioned between two walls in an unsafe area and activated so as to provide an output signal indicative of movement therebetween. The device is particularly suitable for measuring rock movement in mining excavations or tunnels.

BACKGROUND OF INVENTION

Instrumentation for monitoring rock movement is a key element to safety and economy in any mining or underground excavation operation. Room closure meters, commonly known as extensometers or convergence meters are conventionally used to provide information on ground conditions and stability so as to check the safety of the excavation and prevent accidents during and after the excavation operations. The information can also be used by scientists for excavation modelling and design, in back-analysis of trial excavations, the verification of engineering design data, and the calibration of numerical models used to predict ground behaviour in other regions of the excavation project.

In unstable areas, however, it is often very difficult for a worker to get in to place the room closure meters without risking great physical danger, and yet it is essential to monitor such areas so as to ascertain the degree of instability and to give an indication of whether access to the area should be restricted or prohibited. Unfortunately, there do not appear to be any instruments available which are capable of remote installation and which will then provide an output signal, representative of actual site conditions, for remote reading and interpretation. All that can generally be done is to make visual observations from a safe distance, something not always possible, to verify ground movement and failure.

Many devices to measure room closure have been described in the literature, for example in U.S. Pat. Nos. 3,042,912; 3,786,503 and 4,514,905, but all require on-site installation. Remote installation of a yieldable mine post system is also known and is described in U.S. Pat. No. 5,215,411, but this does not make any measurements and is not, therefore suitable for the present purposes.

OBJECT OF INVENTION

Thus, an object of the present invention is to provide an instrument for remote monitoring movement between opposed walls in an excavation or the like which can be installed using a remote controlled telescopic boom and then actuated when in place.

A preferred object is to provide an instrument for measuring rock movement in mining excavations or tunnels.

Another object is to provide a method for remotely measuring movement between opposed walls or faces.

BRIEF STATEMENT OF INVENTION

By one aspect of this invention there is provided a device for remotely measuring relative movement between a pair of opposed faces, comprising:

telescoping pole means comprising substantially rigid first and second pole sections extendable from a first, locked, retracted position to a second, slidable, extended position in which a free longitudinal end of each said pole section is in releasable engagement with a respective one of said pair of opposed faces;

resilient means for urging said free longitudinal ends into engagement with said opposed faces; means to releasably secure said pole sections in said retracted position;

potentiometer means operatively mounted between said pole sections, for generating an output signal representative of relative movement between said free longitudinal ends;

and means remote from said potentiometer means to receive said output signal.

By another aspect of this invention there is provided a method for remotely detecting movement between a pair of opposed faces, comprising:

installing a telescopic pole means having substantially rigid first and second pole sections extendable from a first, locked retracted position to a second, slidable, extended position, resilient means for urging said pole sections into said extended position, means to releasably secure said pole sections in said retracted position and means to measure relative movement between said pole sections, between said opposed faces while in said retracted position; releasing said means to releasably secure said pole sections in said retracted position, from a location remote from said pole sections, so as to permit said pole sections to be resiliently urged into contact with respective ones of said opposed faces; measuring relative movement between said pole sections so as to produce an output signal representative thereof; reading said output signal from a location remote from said pole sections.

DETAILED DESCRIPTION OF PREFERRED EMBODIMENTS

Figure 1:
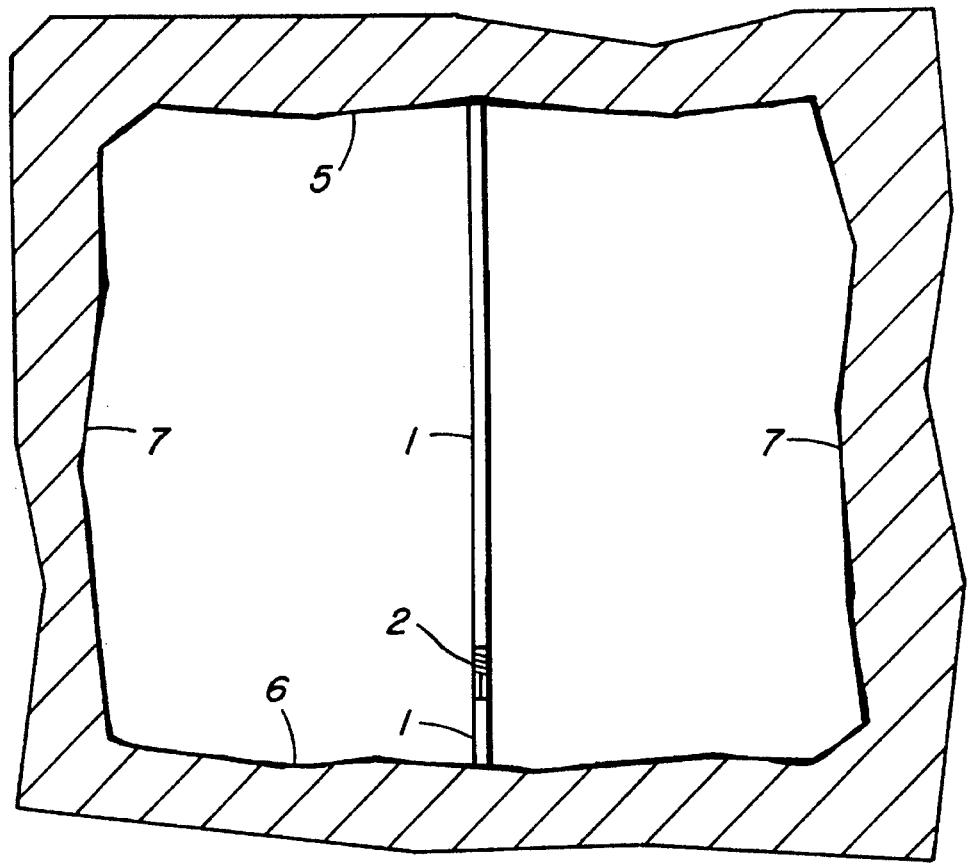
FIG. 1 is a sketch of one embodiment of the invention located in a mine cavity.
Figure 4:
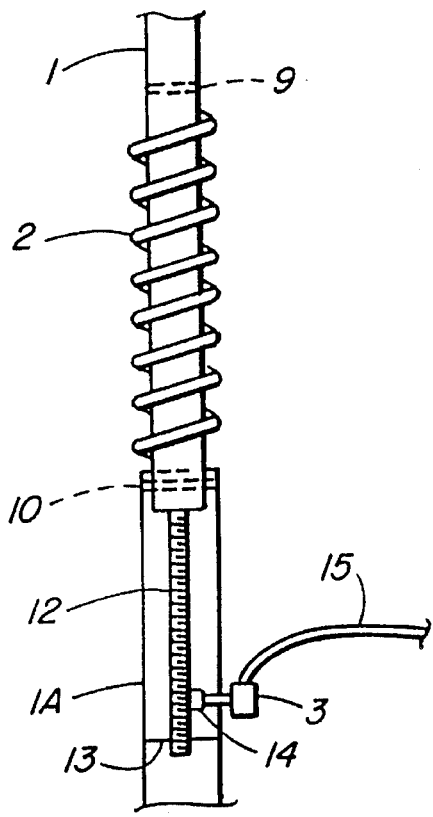
FIG. 4 is an enlarged view of an alternate embodiment of FIG. 1, in expanded position.
Figure 3:
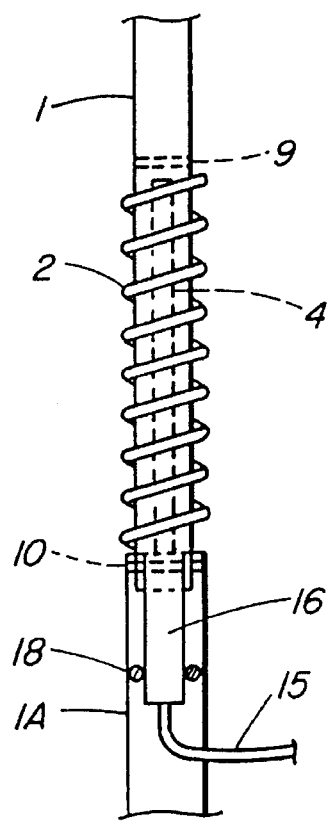
FIG. 3 is an enlarged view of the embodiment of FIG. 2, in expanded position.

In FIG. 1 there is shown a preferred embodiment of the present invention installed between a roof 5 and floor 6 of a mining excavation, for example a drift, having side walls 7. The device comprises a pair of longitudinally extending axially aligned pole sections 1 which telescope one into the other. The pole sections 1 are preferably rigid tubular metal poles, such as steel or aluminium, and are urged into extended position by means of a coaxial coil spring 2 surrounding the pole sections 1. To insert the pole sections between roof 5 and floor 6, the spring is compressed and the pole sections are held in retracted position by means of a removable transverse pin 8 extending through holes 9, 10 in the two sections 1. When in the desired location pin 8 is removed by pulling cable 11, secured thereto, from a safe location. A potentiometer is arranged between the poles 1 so as to measure linear movement therebetween. The potentiometer may be of the linear type 4 as shown in FIG. 3 or of the rotary type 3 as shown in FIG. 4. In the rotary type 3, a threaded rod 12 is axially secured to one end of upper pole section 1 and passes through a guide plate 13 secured in lower pole section 1A. A gear 14 engages rod 12 and rotates as pole sections 1 move longitudinally relative to each other. This rotary movement is detected by potentiometer 3 and a signal therefrom is transmitted via readout cable 15 to a remote readout (not shown) in a safe location. FIG. 3 shows a similar device in which a potentiometer head 16 is mounted on the lower pole section 1A in guide 18 and is provided with a linear rod 4 which is secured in upper pole section 1 so that as pole sections 1, 1A move relative to each other a signal is generated for transmission via readout cable 15 to a remote readout (not shown) in a safe location.

Figure 2:
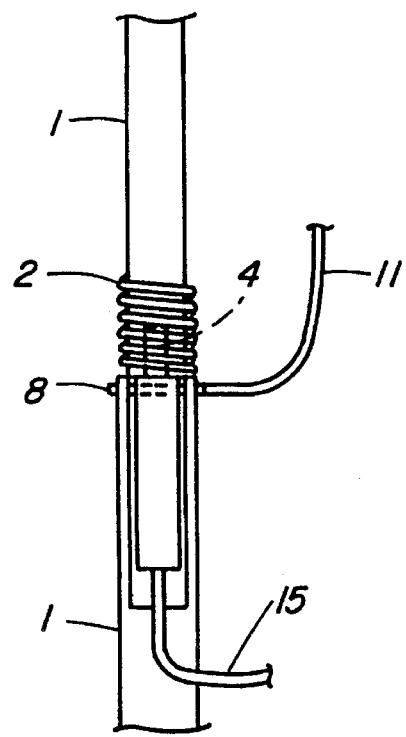
FIG. 2 is an enlarged view of the embodiment of FIG. 1, in contracted position.
Figure 5:
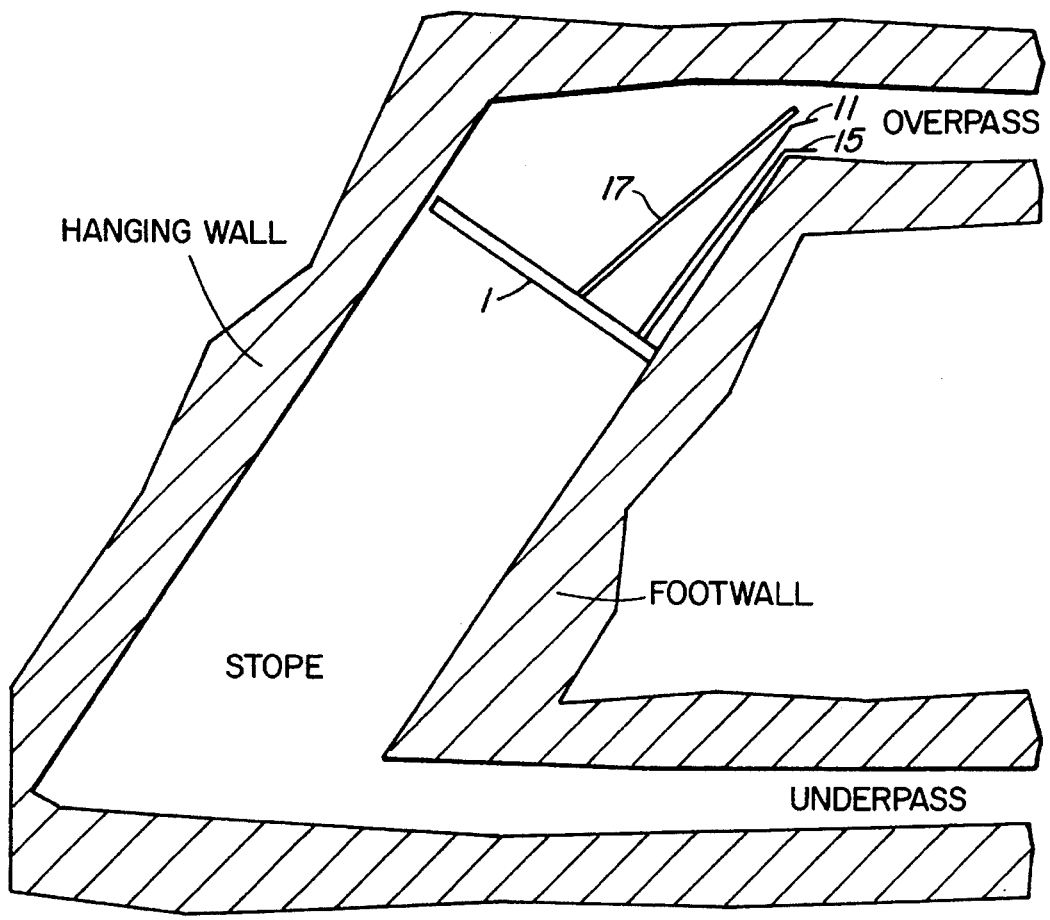
FIG. 5 is a sketch showing installation of an instrument of the present invention in a mine stope.

With the holding pin 8 in position, as shown in FIG. 2, the contracted poles 1 can be moved to any desired location by any convenient manual or machine carried boom 17 (as shown in FIG. 5). FIG. 5 shows the device located between a hanging wall and a footwall in a stope, which has been inserted from the overpass. When in position, the cable 11 is pulled, thus releasing the pin 8 and the compression spring 2 forces the ends of poles 1 into engagement with the hanging and footwalls. The device is now ready to monitor any movement between the hanging wall and the footwall, and the potentiometer will create an output signal which can be read at a safe distance from the site being monitored using any convenient readout meter, computer or graphical display means.

While this invention has been described with particular reference to mining excavations and the like, it will be appreciated by those skilled in the art that the principles thereof are equally applicable in many other civil and tunnelling engineering environments, such as the measurement of subsidence in roads, bridges, buildings and the like, or anywhere where two opposing walls are moving together or away from each other.

I claim:

1. A lightweight and easily portable device for remotely measuring relative movement between a pair of substantially unsupported opposed faces, comprising:

telescoping pole means comprising substantially rigid lightweight tubular metal first and second pole sections extendable from a first, locked, retracted position to a second, slidable, extended position in which a free longitudinal end of each said pole section is urged into releasable engagement with a respective one of said pair of opposed faces; resilient compression spring means for urging said free longitudinal ends into engagement with said opposed faces;

means to releasably secure said pole sections in said retracted position;

potentiometer means operatively mounted between said pole sections, for generating an output signal representative of relative movement between said free longitudinal ends; and;

means, remote from said potentiometer means, to receive said output signal.

2. A device as claimed in claim 1 wherein said first and second pole sections include respective hole means alignable with each other in said first retracted position, and said means to releasably secure said pole sections in said retracted position comprises transverse pin means insertable in said respective hole means.

3. A device as claimed in claim 2 wherein said potentiometer means is mounted on said first section of said pole means and operatively connected to said second section of said pole means.

4. A device as claimed in claim 3 wherein said potentiometer means is a rotary potentiometer.

5. A device as claimed in claim 3 wherein said potentiometer is a linear potentiometer.

6. A device as claimed in claim 1 including boom means to locate said pole means between said opposed faces.

7. A device as claimed in claim 2 including cable means secured to said pin means whereby said pin means can be withdrawn from a position remote from said pole means.

8. A method for detecting movement between a pair of substantially unsupported opposed faces, from a location remote therefrom, comprising:

installing a telescopic pole means having substantially rigid lightweight tubular first and second pole sections extendable from a first, locked, retracted position to a second, slidable, extended position, resilient compression spring means for urging said pole sections into said extended position, means to releasably secure said pole sections in said retracted position and means to measure relative movement between said opposed faces while said pole sections are in said extended position therebetween; releasing said means to releasably secure said pole sections in said retracted position, from a first location remote from said pole sections, so as to permit said pole sections to extend from said first position to said second position and be resiliently urged into contact with respective ones of said opposed faces;

measuring relative movement between said pole sections so as to produce an output signal representative of said movement between said opposed faces; and reading said output signal from one of said first location remote from said pole sections and a second location remote from said pole sections.

9. A method as claimed in claim 8 wherein said installation step includes positioning said pole sections between said faces with remotely controlled boom means.

* * * * *